(12) United States Patent
Branner (10) Patent No.: US 7,318,527 B2
(45) Date of Patent: Jan. 15, 2008

(54) APPARATUS FOR SEPARATING ORGANIC MATERIAL FROM INORGANIC MATERIAL

(75) Inventor: Wolfgang Branner, Berching (DE)

(73) Assignee: Hans Huber AG Maschinen-und Anlagenbau (DE)

( * ) Notice: Subject to any disclaimer, the term of this patent is extended or adjusted under 35 U.S.C. 154(b) by 417 days.

(21) Appl. No.: 10/946,417

(22) Filed: Sep. 21, 2004

(65) Prior Publication Data
US 2005/0061715 A1 Mar. 24, 2005

(30) Foreign Application Priority Data
Sep. 22, 2003 (DE) ............................... 103 43 788

(51) Int. Cl.
*B03D 5/62* (2006.01)
(52) U.S. Cl. .................... 209/1; 209/160; 209/161; 241/188.1
(58) Field of Classification Search .................... 209/1, 209/161, 160; 241/188.1
See application file for complete search history.

(56) References Cited

U.S. PATENT DOCUMENTS

| 630,309 | A | | 8/1899 | Aberg et al. | |
|---|---|---|---|---|---|
| 964,261 | A | * | 7/1910 | Janney | ........................ 209/161 |
| 1,035,145 | A | * | 8/1912 | Beeken | ........................ 209/158 |
| 1,277,145 | A | | 8/1918 | Sowers et al. | |
| 2,519,781 | A | * | 8/1950 | Morris | ........................ 209/132 |
| 4,124,497 | A | * | 11/1978 | Hulegard | ........................ 209/3 |
| 5,167,375 | A | | 12/1992 | Datta | |
| 5,641,397 | A | | 6/1997 | Grienberger | |
| 5,811,016 | A | | 9/1998 | Zierler | |

FOREIGN PATENT DOCUMENTS

| DE | 4415647 A1 | 2/1996 |
|---|---|---|
| DE | 29614456 U1 | 11/1996 |
| DE | 19805451 A1 | 8/1999 |
| DE | 19844006 A1 | 4/2000 |
| EP | 0469360 A2 | 2/1992 |
| EP | 0707520 B1 | 4/1996 |
| EP | 0713418 B1 | 5/1996 |
| EP | 1002563 A1 | 5/2000 |
| WO | WO 95/05230 | 2/1995 |

* cited by examiner

Primary Examiner—Thomas M. Lithgow
(74) Attorney, Agent, or Firm—Thomas, Kayden, Horstemeyer & Risley, L.L.P.

(57) ABSTRACT

An apparatus (100, 100', 100") for separating organic material from inorganic material includes a container (1), a feeding apparatus (4), a charging apparatus (9), a lifting apparatus (21), a discharging apparatus (24) and a removal apparatus (7). The feeding apparatus (4) is located in the upper portion of the container (1), and it serves to introduce inorganic material polluted with organic material into the container (1). The charging apparatus (9) is located in the lower portion of the container, and it serves to introduce cleaning water into the container (1). The lifting apparatus (21) is located in the container (1), and it serves to substantially subject the inorganic and organic material to an upwardly directed component of movement. The lifting apparatus (21) and the charging apparatus (9) produce a fluidized layer (22) in the container (1) during operation of the apparatus (100, 100', 100"). The fluidized layer (22) causes the organic material to be separated from the inorganic material. The discharging apparatus (24) is located in the lower portion of the container (1), and it serves to discharge inorganic material from the container (1). The removal apparatus (7) is located in the upper portion of the container (1), and it serves to remove organic material from the container (1).

13 Claims, 4 Drawing Sheets

APPARATUS FOR SEPARATING ORGANIC MATERIAL FROM INORGANIC MATERIAL

CROSS REFERENCE TO RELATED APPLICATIONS

This application claims priority to co-pending German Patent Application No. DE 103 43 788.6 entitled "Vorrichtung zum Abtrennen von organischem Material von anorganischem Material", filed Sep. 22, 2003.

FIELD OF THE INVENTION

The present invention generally relates to an apparatus for separating organic material from inorganic material. More particularly, the present invention relates to an apparatus for cleaning organically polluted sand of sewage plants. The inorganic material, especially sand, is cleaned by removing or separating the organic material from it. The separated organic material may be discharged from the apparatus together with the cleaning water. Alternatively, the organic material may be discharged by a separate discharging apparatus.

BACKGROUND OF THE INVENTION

An apparatus for separating organic material from inorganic material is known from German Patent No. DE 44 15 647 C2 corresponding to U.S. Pat. No. 5,641,397 and to European Patent No. EP 0 707 520 B1. The known apparatus includes a container having a vertical axis. The container has a cross-section which enlarges in sections in a downward direction. A feeding apparatus for introducing the polluted inorganic material into the container is arranged in the upper portion of the apparatus. A discharging apparatus for the separated cleaned inorganic material is located in the lower portion of the container. The discharging apparatus is designed as an upwardly inclined spiral conveyor. The apparatus includes a unit for discharging the organic material. This unit is arranged in the upper portion of the container, and it includes an edge via which cleaning water and organic material are discharged. A charging apparatus for cleaning water is arranged in the lower portion of the container and above the discharging apparatus for the separated inorganic material. The charging apparatus includes a aperture plate including a majority of openings, nozzles, and the like, being distributed about the cross-section such that one attains an upwardly directed flow being distributed about the cross-section. The cleaning water is fed into the apparatus at such an amount per time unit and it is distributed by the openings of the plate in an upward direction such that there is a fluidized layer above the aperture plate. The fluidized layer is to be understood as a fluidized bed by which the organically polluted inorganic material is subjected to a movement which is typical for a fluidized bed. This typical movement causes the sand corns to contact the wall of the container such that the organic material sticking to the inorganic material is detached from the inorganic material. Due to the cleaning water flowing in an upward direction, the organic material is guided thereby in an upward direction. The fluidized bed substantially differs from a stirred fixed bed in which the sand corns cannot freely move. The fluidized layer typically has a certain height in the container, the height being watched by a pressure cell. The signals of the pressure cell may be used to control the discharging apparatus for the separated inorganic material. To enable the material to be discharged to reach the region of the discharging apparatus, there is bypass which may be realized in various ways. For example, it may be realized by an opening in the center portion of the aperture plate, the arrangement of a bypass conduit or other openings through which the cleaning water may flow in an upward direction and the cleaned sand may flow in the downward direction. A stirring tool is arranged in the container. The stirring tool includes stirring arms which may be arranged in the lower portion of the fluidized layer and/or in the lower portion of a deposit chamber for the organic material. The known apparatus effectively separates organic and inorganic material. However, the fluidized layer is exclusively produced by the introduced cleaning water such that it is necessary to provide respective amounts per time unit. The velocity of the upwardly streaming water (superficial velocity) is approximately between 5 to 15 m/h. The stirring arms of the stirring tool which are arranged to rotate in the lower portion of the fluidized layer and/or in the lower portion of the depositing chamber for the organic material prevent the formation of channels in the lower portion of the fluidized layer, on the one hand, and they loosen the organic material located above the sand layer, on the other hand, such that polluted material introduced by the charging apparatus may still move through the organic layer to reach the region of the fluidized sand layer.

A method and an apparatus for removing sand from waste water including sand and organic materials in a stationary container are known from European Patent No. EP 0 713 418 B1 corresponding to U.S. Pat. No. 5,811,016. A feeding apparatus is arranged in the upper portion of the container. A discharging apparatus for the separated inorganic material is located just above the lower portion of the container. The discharging apparatus is designed as a spiral conveyor. A feeding conduit for fresh water is also located in this portion. By this feeding conduit, fresh water is subjected to a rotary flow in which the specifically lighter organic material moves in an upward direction towards an overflow, while the specifically heavier sand corns sink towards the bottom of the container to form a pile of sand which is mechanically stirred by a stirring tool such that the sand corns get in frictional contact with one another to remove organic material sticking to the sand corns. The removed organic material is transported in an upward direction by the upwardly directed flow produced by the introduced fresh water. In this way, the polluted sand contained in the fixed bed is mechanically stirred, and it is only removed in an amount which ensures a predetermined minimum level of the deposited sand. Consequently, the cleaning effect is substantially caused by the mechanical movement of the sand corns in the fixed bed by the stirring tool. For this purpose, the stirring tool needs to have appropriate power.

A removal method for mineral sand from a mix of water, organic components and sand to be treated is known from German Patent Application No. DE 198 44 006 A1. The mix is introduced into a deposit container from above. Small bubbles of air move through the mix from below in an upward direction such that the organic components and the sand are separated in a vertical direction depending on their density. Due to its greater density, the sand is removed in a controlled way. The mix of sand, water and organic components may also be mechanically stirred during the movement of the air bubbles through the mix. The sand deposited in a fixed bed in the bottom portion of the container may be used to determine the torque to be supplied for stirring. The fluidity of the mix may be controlled by additional water supply from above. The apparatus may also fulfill the function of a sand separator or a sand catcher. Due to the small bubbles moving through the mix of sand, water and organic material, the mix is respectively moved which leads to the desired separating effect.

SUMMARY OF THE INVENTION

The present invention relates to an apparatus for separating organic material from inorganic material. The apparatus includes a container, a feeding apparatus, a charging apparatus, a lifting apparatus, a discharging apparatus and a removal apparatus. The container has an upper portion and a lower portion. The feeding apparatus is located in the upper portion of the container, and it is designed and arranged to introduce inorganic material polluted with organic material into the container. The charging apparatus is located in the lower portion of the container, and it is designed and arranged to introduce cleaning water into the container. The lifting apparatus is located in the container, and it is designed and arranged to substantially subject the inorganic and organic material to an upwardly directed component of movement. The lifting apparatus and the charging apparatus are designed and arranged to produce a fluidized layer in the container during operation of the apparatus. The fluidized layer causes the organic material to be separated from the inorganic material. The discharging apparatus is located in the lower portion of the container, and it is designed and arranged to discharge inorganic material from the container. The removal apparatus is located in the upper portion of the container, and it is designed and arranged to remove organic material from the container.

The apparatus includes a container which may be especially designed to have a circular cross-section. However, it may also have a different cross-section, for example a polygon-like cross-section. It has a vertical axis, and it may include a plurality of cylindrical portions and conical portions which are interconnected. It is preferred to arrange the portions such that the cross-section increases from the top side towards the bottom side of the apparatus.

Generally, material which is removed from sand catchers of sewage plants, from sewerage during sewerage cleaning, or from road sweepings collected by road cleaning machines, for example, includes inorganic material in the form of sand, stones, and the like. In addition, it includes a substantial portion of organic material. Before transportation of the inorganic material to a disposal site or before other use of it, it needs to be freed from organic material to a certain extent to be deposited at reasonable costs.

The novel apparatus realizes efficient cleaning by removing most of the organic material from the inorganic material and by separately discharging the organic material and the inorganic material. The novel apparatus has a comparatively simple structure such that it may be manufactured at comparatively low costs.

The novel apparatus uses a fluidized bed to realize more effective separation of inorganic material and organic material (which sticks to the inorganic material) compared to known apparatuses using a fixed bed. A fluidized sand layer in the form of a fluidized bed is maintained in the lower portion of the container. The movement of the sand corns according to the fluidized bed causes the organic material to be detached from the inorganic material. The particles of organic material are decreased in size, and they are removed by the cleaning water in an upward direction.

The fluidized bed is not only produced and maintained by feeding cleaning water into the container. The novel apparatus additionally includes a lifting or elevating apparatus which together with the charging apparatus for the cleaning water being located in the lower portion of the container produces and maintains the fluidized layer. The lifting apparatus is to be understood as an apparatus which "lifts" or elevates the material in the water. In other words, it supplies a component of movement to the sand corns in a vertical upward direction, meaning in the same direction as the introduced cleaning water. A rotary flow is initiated in the fluidized bed such that an opposed flow cleaning effect is attained in some portions of the fluidized bed.

Due to the fact that the lifting apparatus contributes to producing and maintaining the fluidized bed, there is the advantage of having to introduce less water by the water charging apparatus. The design and arrangement of the apparatus may be chosen such that the cleaning water supply (when taken alone) does not allow the fluidizing point to be exceeded. The vertical moving component supplied by the lifting apparatus is required to exceed the fluidizing point to attain a fluidized bed. However, it is also possible to supply the cleaning water in such an amount which is (when taken alone) already sufficient to exceed the fluidizing point to additionally realize the rotary flow and the opposite flow cleaning effect in the region of the fluidized bed. Consequently, one attains an improved cleaning effect.

The novel apparatus may also be advantageously used when comparatively small amounts of organic material are to be removed from inorganic material. The lifting apparatus subjects the mix of inorganic material and organic material in the region of the fluidized bed to an upwardly directed component of movement. Thus, the lifting apparatus substantially differs from a stirring tool which subjects the sand corns to a substantially horizontal component of movement.

The additional arrangement of the lifting apparatus also provides the advantage of the fluidized bed being moved on a predetermined path of movement due to the above described rotary flow. In this way, the formation of channels, as it is typically known in fixed beds, is counteracted in the first place.

The lifting apparatus may be realized in an especially simple way at comparatively low costs by using a conveyor spiral as the lifting apparatus. The conveyor spiral is located in the center of the container in a perpendicular arrangement, and the conveyor spiral is driven by a shaft. The shaft protrudes into the container from above such that the associated drive may be easily arranged above the container and thus above the water level. The lifting apparatus being designed as a conveyor spiral may also include stirring arms such that one attains a common drivable unit which fulfills the function of the lifting apparatus as well as the function of a stirring tool. However, the arrangement of a stirring tool is not required for attaining the desired cleaning effect. However, it may be useful to loosen a comparatively solid organic layer located above the fluidized bed with the stirring arms to ensure that the organic material is removed, on the one hand, and that new material to be cleaned (which is introduced by the feeding apparatus from above) may move in a downward direction into the cleaning zone of the fluidized bed, on the other hand.

As it has been explained with respect to the example of a conveyor spiral, the lifting apparatus may be designed as a mechanically operated unit. This unit is arranged in a center portion of the container. Preferably, it is arranged in a portion of the container which forms a cylindrical vertical section. However, it is also possible to design the lifting unit as a pneumatically operated unit which works with gas, for example air, such that the lifting unit is a compressed air supplier. The supply of air is preferably realized from above. The air streams out in the lower portion of the fluidized bed in a controlled way, meaning below the water level such that the air subjects the organic and inorganic material to a vertical component of movement which together with the supply of cleaning water produces and maintains the fluidized bed. It is also possible to use a plurality of lifting apparatuses in combination. For example, a combination of a mechanical lifting apparatus and a pneumatic lifting apparatus is possible. The lifting apparatus may also be part of a stirring tool including a shaft being driven from above. However, the lifting apparatus mainly provides a vertical component of movement, while the horizontal component of movement of the stirring tool is only used in addition.

The apparatus includes a charging apparatus for cleaning water which may be designed as an annular conduit including exiting openings. The charging apparatus has a different design than aperture plates known from the prior art. Such known aperture plates include nozzle-like openings being upwardly directed and being spaced apart about the cross-section of the aperture plate. Such nozzle-like openings may be contaminated or even clogged such that the aperture plate is partly closed. The novel charging apparatus including an annular conduit having exiting openings is less susceptible to failure. The number of exiting openings is generally less than the one of an aperture plate. Such an annular conduit is sufficient since the fluidized bed is produced and maintained not extend over the entire horizontal cross-section, but rather in an annular gap between the lifting apparatus and the inner diameter of the container. In this way, the cleaning water may be fed into the annular gap in a controlled way.

It is especially preferred to arrange a protecting collar above the annular conduit at the inner wall of the container. The protecting collar forms a free space in a downward direction in which the annular conduit is arranged. The exiting openings of the annular conduit may be arranged to be directed in an upward direction into the free space. The free space is kept free from depositing sand in all operational conditions such that contamination and clogging of the exiting openings is not possible. The exiting openings may however also be arranged at the annular conduit to face to the sides or in a downward direction. The protecting collar is designed in a way that the cleaning water (after having exited through the exiting openings of the annular conduit) flows according to a flow path which is first directed in a downward direction, and which then inverts its moving direction to flow in an upward direction through the chamber which is surrounded by the protecting collar. For this purpose, it makes sense to arrange the shaft of the lifting apparatus (or the supply of air of a lifting apparatus using air) to reach below the annular conduit such that an annular cross-section is already formed in the region where the cleaning water flows in an upward direction. When the lifting apparatus is designed as a conveyor spiral, a deflecting plate may be located at the lower end of the conveyor spiral. The outer diameter of the deflecting plate corresponds to the outer diameter of the spirals of the conveyor spiral. This arrangement also serves to realize an annular cross-section for the production of a fluidized bed including the superimposed rotary flow. In this way, the cleaning water is concentrated in the annular cross-section, and the deflecting plate for the cleaning water flowing in an upward direction improves the lifting effect of the conveyor spiral.

Due to the fact that the novel apparatus operates while maintaining a fluidized bed, there is the possibility of determining the extension of the fluidized bed with a pressure detector. Such a detector or sensor is located in the region of the fluidized layer and connected to the wall of the container to control the height of the fluidized layer (meaning the vertical extension of the fluidized bed in the container) by controlling the discharging apparatus for the cleaned inorganic material. The discharging apparatus for the separated inorganic material is operated in a clogged manner. The cleaned sand moves through the annular cross-section in the protecting collar in the lower portion of the container in a downward direction. It deposits there in the form of a fixed bed. The height of the fixed bed would increase to extend in an upward direction through the protecting collar during continuous operation of the apparatus. This increase is only acceptable as far as the cleaning water supply is not obstructed. To ensure correct functionality of the apparatus, the cleaned sand has to be removed from the fixed bed from time to time to keep the height of the fixed bed approximately constant by actuating the discharging apparatus.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
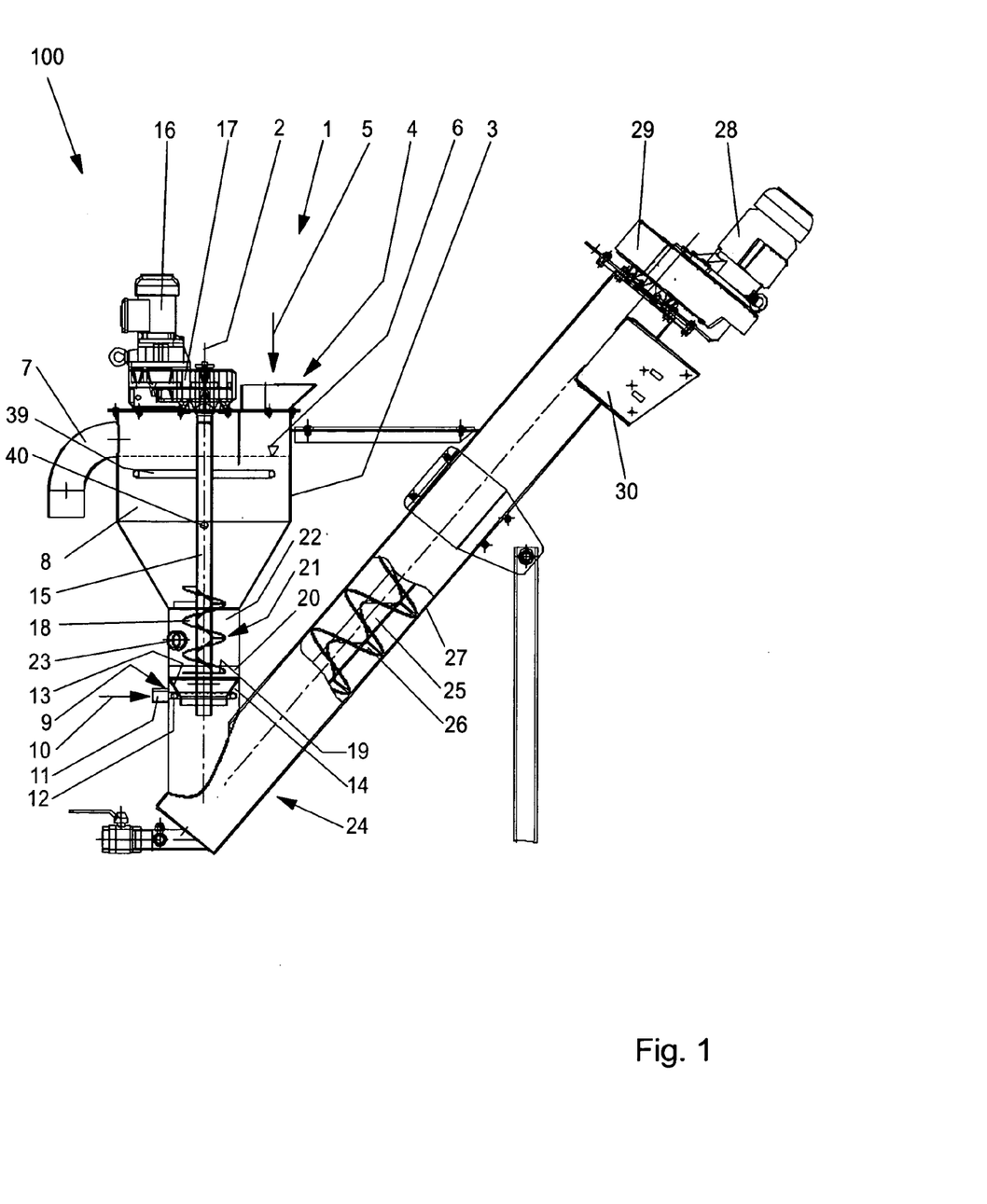
FIG. 1 is a schematic side view of the novel apparatus.

Referring now in greater detail to the drawings, FIG. 1 illustrates a first exemplary embodiment of the novel apparatus 100 for separating organic material from inorganic material. The apparatus 100 includes a container 1 having a vertical axis 2. The container 1 includes a wall 3, preferably a round wall 3. The axis 2 is arranged to be approximately vertical. The wall 3 of the container 1 includes a plurality of sections having a cylindrical and/or a truncated conical shape. These sections are especially arranged in a way that their cross-section increases in an upward direction, as this is illustrated in FIG. 1.

The container 1 in its upper portion includes a feeding apparatus 4 through which the inorganic material being contaminated with organic material enters the container 1 according to arrow 5. For example, the feeding apparatus 4 may have the shape of a funnel. The water level 6 attained during operation of the apparatus 100 is schematically illustrated in FIG. 1.

A removal apparatus 7 for the removal of organic material and liquid is located in the upper portion of the wall 3 of the container 1. Instead of one removal apparatus 7, it is also possible to arrange two separate apparatuses at the same level. In this case, the first apparatus is designed to discharge liquid, and the second apparatus is designed to discharge organic material. The apparatus for discharging organic material is arranged below the apparatus for discharging liquid. The apparatus for discharging organic material is connected to a collecting chamber 8 in which the organic material is collected during operation of the apparatus 100.

A charging apparatus 9 for introducing cleaning water is located in the lower portion of the container 1. Cleaning water is introduced into the interior of the container 1 by the charging apparatus 9 according to arrow 10. An inlet piece 11 is permanently connected to an annular conduit 12 being located inside of the container 1. The cleaning water is supplied by the conduit 12.

A protecting collar 13 is arranged above the annular conduit 12, the protecting collar 13 partly contacting the inner side of the wall 3 of the container 1. The protecting collar 13 is tapered in a downward direction. It may end in a cylindrical portion the lower end of which is arranged below the annular conduit 12. In this way, one attains a free space 14 between the wall 3 and the conical protecting collar 13. The free space 14 may be used to arrange the annular conduit 12.

A shaft 15 protrudes into the container 1 from above. The shaft 15 is designed and arranged to be rotated by a motor 16 and a transmission 17. The shaft 15 in a portion beginning slightly above the protecting collar 13 includes a conveyor spiral 18. The conveyor spiral 18 at its lower end may be designed to include a deflecting plate 19. In this way, the conveyor spiral 18 is designed to be closed in a way that there is an annular cross-section 20 between the outer diameter of the deflecting plate 19 and the inner wall 3 of the container 1. In this way, the shaft 15 and the conveyor spiral 18 are part of a first exemplary embodiment of a lifting apparatus 21 which acts upon the mix of water and organically polluted inorganic material starting at the annular cross-section 20. In the illustrated exemplary embodiment of FIG. 1, the lifting apparatus 21 is designed as a mechanical lifting apparatus. The shaft 15 and the conveyor screw 18 are part of the mechanical lifting apparatus 21. The lifting apparatus 21 acts upon the inorganic material and the organic material in a way that they are moved in an upward direction in the container 1. The prevailing conditions will be explained in greater detail with respect to FIG. 2. The shaft 15 with its lower end protrudes through the protecting collar 13. The shaft 15 ends below the collar 13, and in this way it forms the annular cross-section 20 already in the region of the protecting collar 13.

During operation of the apparatus 100, one attains a fluidized layer 22. The fluidized layer 22 is located approximately between the protecting collar 13 and the end of the lifting apparatus 21 and of the conveyor spiral 18, respectively, and slightly beyond that place. Such a fluidized layer 22 is generally known in the art of wastewater engineering, and it is also called a fluidized bed. In such a fluidized bed, the water and the particles contained therein form a suspension.

A detector 23 is arranged in the region of the fluidized bed 22 and outside of the wall 3 of the container 1. The detector 23 serves to determine the density of the fluidized bed 22. The sensed pressure signals are used to determine the density of the mix contained in the fluidized layer 22 and thus the extension of the fluidized bed. Preferably, these signals are used to convey the cleaned inorganic material in an inclined upward direction. Before this, the cleaned inorganic material has moved through the annular cross-section in the region of the protecting collar 13 in a downward direction. The material is removed by a discharge apparatus 24 being arranged at the lower end of the container 1. The discharging apparatus 24 for the inorganic material includes a conveyor spiral unit including a shaft 25, a conveyor spiral 26 and a housing 27. The conveyor spiral unit including the shaft 25 is driven in a clocked manner by a motor 28 and a transmission 29 located downstream. A chute 30 is located in the upper region of the housing 27. The cleaned inorganic material is removed by the chute 30 above the water level 6.

Figure 2:
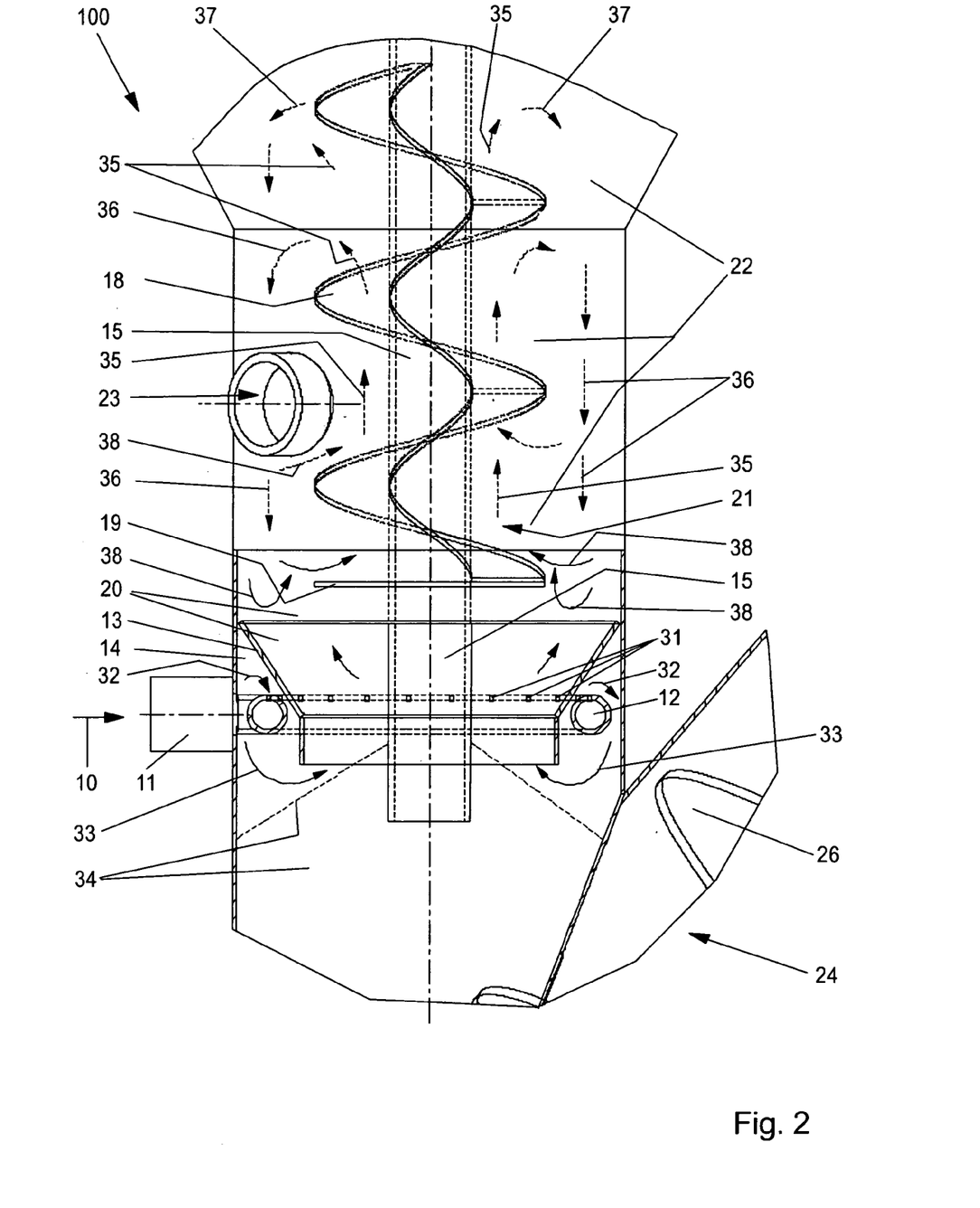
FIG. 2 is a detailed sectional view of a part of the novel apparatus.

The conditions prevailing during operation of the apparatus 100 are now explained with respect to FIG. 2. At the beginning, the apparatus 100 is filled with cleaned inorganic material, meaning for example sand. The sand deposits in the lower portion in the form of a sand cone or pile. The sand cone approximately ends in the region of the upper end of the protecting collar 13 such that the inner cross-section of the protecting collar 13 is more or less completely filled with sand. Then, the charging apparatus 9 for cleaning water is actuated such that cleaning water enters the container 1 through the annular conduit 12 according to arrow 10 and through the inlet piece 11. The annular conduit 12 includes exiting openings 31 facing in an upward direction. The exiting openings 31 are uniformly distributed about the circumference of the annular conduit 12. The cleaning water exits through the exiting openings 31 of the annular conduit 12, and it enters the free space 14 being located below the protecting collar 13. It is to be seen in FIG. 2 that no sand is located in the free space 14. Instead, air and/or water are located in the free space 14 such that the exiting openings 31 are not blocked or polluted even during standstill of the apparatus 100. The exiting cleaning water initially inverts its direction of flow according to arrow 32, and it then flows under the lower edge of the protecting collar 13 according to arrow 33. During this movement, the cleaning water carries cleaned sand with it in an upward direction by flowing through the annular space between the protecting collar 13 and the shaft 15 in an upward direction, while a pile of sand 34 (indicated by a broken line) remains in the lower portion below the protecting collar 13. The water carrying the cleaned sand in an upward direction causes the water to reach the water level 6 (FIG. 1). At the same time, this flow produces a fluidized layer 22 extending along a certain part of the height of the container 1. The sand corns move within the fluidized layer 22 in the sense of a fluidized bed. The characteristics of a fluidized bed are generally known in the art of wastewater engineering, and they therefore will not have to be explained in greater detail herein.

As soon as the motor 16 and thus the lifting apparatus 21 are actuated, an additional moving component oriented in a vertical upward direction acts upon the cleaned sand corns. The fluidized bed increases its extension in an upward direction to form the fluidized layer 22. The fluidized layer 22 approximately ends at the upper end of the conveyor spiral 18. Due to the coordination of the upwardly flowing cleaning water, on the one hand, and the lifting apparatus 21, on the other hand, the fluidized layer 22 does not only attain its final extension in a vertical direction. At the same time, the fluidized layer 22 is subjected to a turn over (rotary) flow which is indicated by the various arrows inside of the fluidized layer 22. In the radial inward portion, especially between the conveyor spiral 18 and the shaft 15, the sand corns will mainly move in an upward direction within the fluidized layer 22 according to arrows 35. At a greater radius close to the wall 3, the sand corns will mainly move in a downward direction according to arrows 36. As illustrated in FIG. 2, there is an annular roll flow in the fluidized layer 22. The inversion of the direction of flow is indicated by arrows 37 and 38. The inversion of the direction of flow in the lower portion may reach the annular cross-section at the height of the protecting collar 13, while the upper end of the roll flow could also be located above the upper end of the conveyor spiral 18.

Inorganic material being polluted with organic material is introduced into the container 1 from above by the feeding apparatus 4. The material deposits in the fluidized layer 22. Due to the typical movement of the sand corns in the fluidized bed, their mutual contact and their contact to the inner wall 3 of the container 1, the organic material is detached from the inorganic material, it is reduced in size, and it is continuously cleaned. The lighter organic material is carried in an upward direction by the cleaning water, while the sand corns mainly move in a downward direction due to their decreasing contamination level and their increasing density resulting therefrom. The sand corns sink down and deposit in the lower portion of the fluidized layer 22. During this downward movement, some of the sand corns also move through the annular space between the shaft 15 and the protecting collar 13 further in a downward direction to deposit on the pile of sand 34. When the pile of sand 34 has reached a certain level, no more sand deposits on it since it is carried away by the flow of water. Since new material is still fed into the container 1, the density of the fluidized layer 22 increases. The density is sensed by the detector 23, and signals are transmitted by the detector 23 to a control apparatus (not illustrated). These signals are used to actuate the discharging apparatus 24, and to operate it for a specific period of time. In this way, the deposited pile of sand 34 is reduced in size, and its upper limit is dislocated to a lower level, respectively. Consequently, cleaned sand corns may again move through the fluidized layer 22 in a downward direction to deposit on the pile of sand 34. Thus, the density of the fluidized layer 22 is decreased. In this way, the polluted material is continuously cleaned even when material is continuously fed into the container 1.

The detached organic components located within the fluidized layer 22 are comparatively lighter such that they are carried by the cleaning water in an upward direction and deposit in the depositing chamber 8. The shaft 15 of the lifting apparatus 21 may include stirring arms 39, 40 (FIG. 1) being located in the region of the depositing chamber 8 and/or in other regions. The stirring arms 39, 40 substantially serve to loosen and break up a comparatively solid layer of organic material in this portion such that the organic material is discharged together with the cleaning water by the apparatus 7. Additional stirring arms (not illustrated) may also be located in the region of the fluidized layer 22. Such stirring arms may supply a more or less horizontal component of the moving direction to the sand corns in addition to the lifting apparatus 21.

Figure 3:
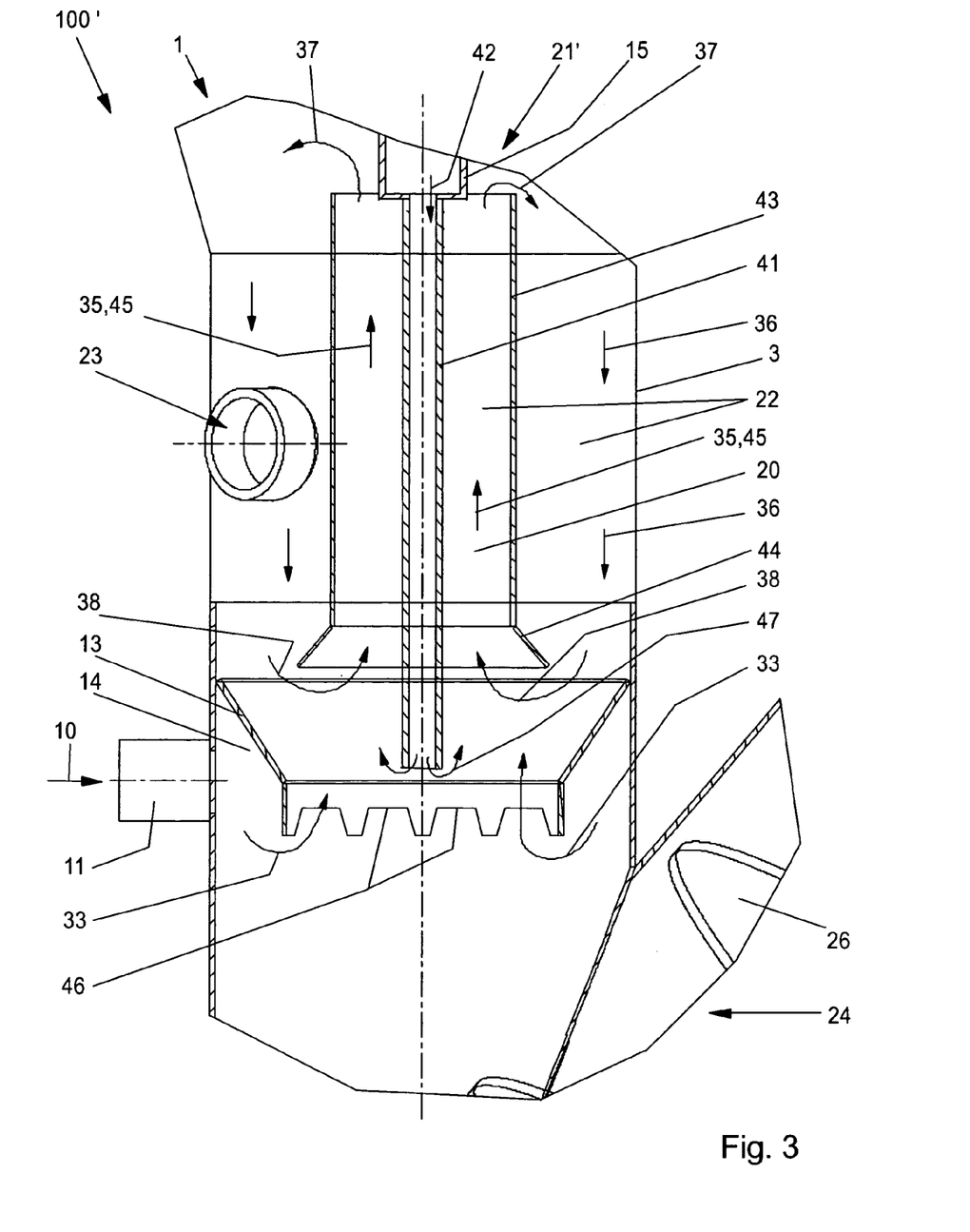
FIG. 3 is a detailed sectional view of a second exemplary embodiment of the novel apparatus.

The exemplary embodiment of the novel apparatus 100' according to FIG. 3 includes a lifting apparatus 21 which is designed to be pneumatic. The shaft 15 is designed to be hollow, and it includes a protrusion 41 being stepped with respect to its diameter. Compressed air is introduced from above through the interior of the shaft 15 and the protrusion 41 according to arrow 42. Since the shaft 15 and the protrusion 41 are driven, the compressed air is supplied by a rotating connection. The compressed air exits the lower end of the protrusion 41 according to arrow 47, and it inverts its direction of flow when cleaning water is respectively supplied. A cylindrical wall 43 is fixedly connected to the shaft 15. The wall 43 at its lower end may include a protruding collecting collar 44. The compressed air streams within the cylindrical wall 43 according to arrow 45 in an upward direction such that the sand corns are subjected to an upwardly directed component of movement according to arrow 35 during operation of the apparatus 100'. The cylindrical wall 43 is designed to be opened in an upward direction such that the roll flow is inverted inside of the fluidized layer 22 according to arrow 37. The cylindrical wall 43 may be connected to the shaft 15 to be rotatingly driven. However, it is also possible to connect the cylindrical wall 43 to the wall 3 in a stationary manner. In both cases, one attains a flow of the fluidized layer 22 which is superimposed in an annular or roll-like way. In this way, the same effects are attained as they have been explained with respect to the apparatus 100 according to FIGS. 1 and 2 which includes a mechanical lifting apparatus 21. Finally, it is also imaginable to design the apparatus in a way to include mechanical and pneumatic lifting apparatuses in a combined fashion.

The supply of cleaning water is realized in a simplified way in the apparatus 100'. There is no annular conduit 12 such that the free space 14 below the protecting collar 13 is used for distribution of the cleaning water. The lower edge of the protecting collar 13 includes teeth and recesses 46, respectively, by which the supplied cleaning water is guided through the chamber in the protecting collar 13 in an upward direction according to arrows 32. The flow is guided and homogenized by the cylindrical wall 43. The upwardly directed components of the flow prevail inside of the cylindrical wall 43, while the upwardly directed flow of the inverting flow takes place outside of the cylindrical wall 43. It is to be understood that the fluidized bed and the fluidized layer 22, respectively, prevail in all cross-sections of the flow.

Figure 4:
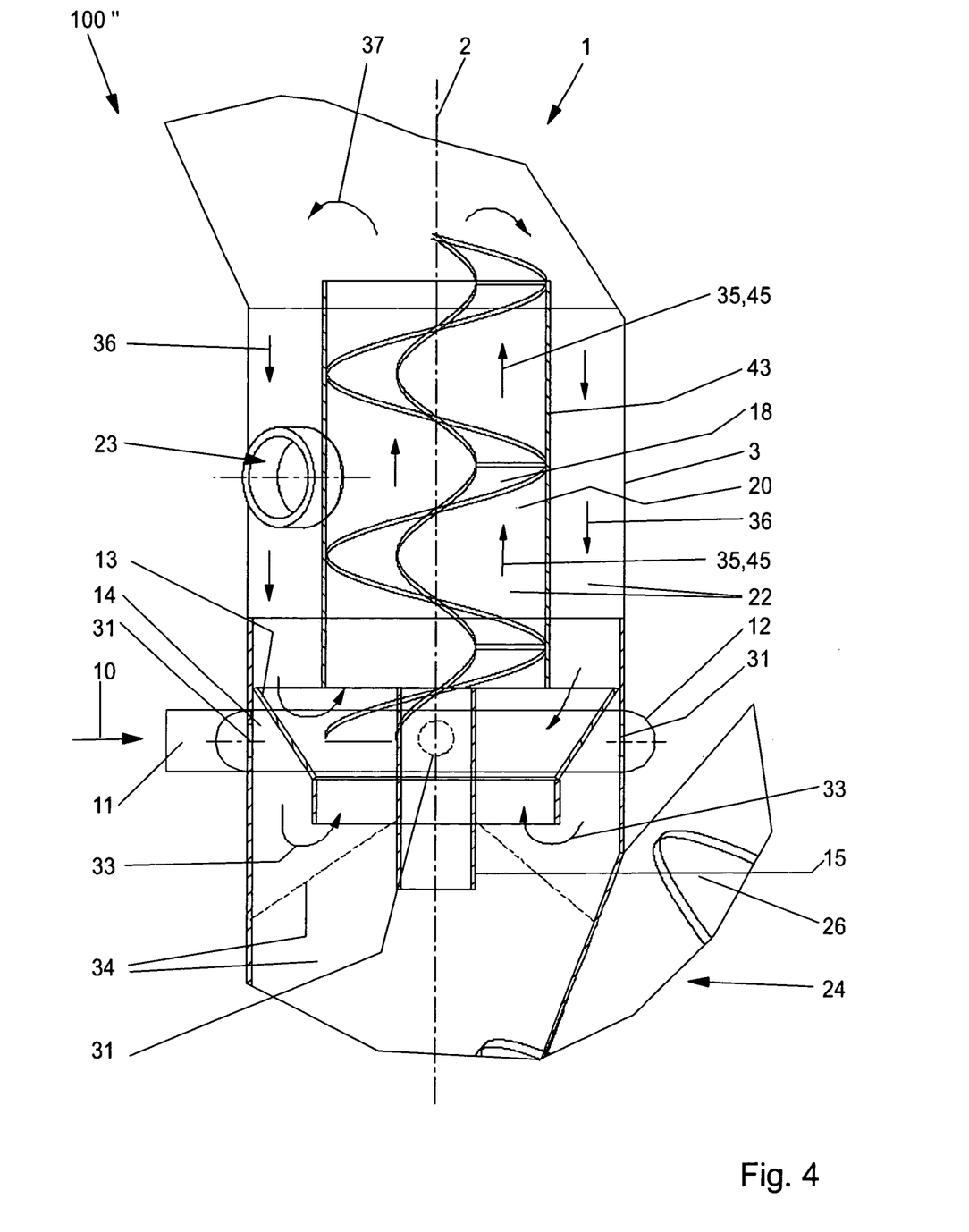
FIG. 4 is a detailed sectional view of a third exemplary embodiment of the novel apparatus.

FIG. 4 illustrates another embodiment of the novel apparatus 100" in which the cylindrical wall 43 is associated with the conveyor spiral 18. It is to be understood that a shaft 15 (not illustrated) is arranged above the conveyor spiral 18. For this purpose, it is referred to the description with respect to FIG. 1. The shaft 15 extends into the lower portion of the conveyor spiral 18, while a comparatively great portion of the height of the conveyor spiral 18 does not include a shaft. The cylindrical wall 43 is connected to the conveyor spiral 18 to form a common rotating unit. The unit is designed to be opened at the top side and at the bottom side. Again, an upwardly directed component of movement according to arrows 35, 45 prevails inside of the cylindrical wall 43. The annular conduit 12 is arranged outside of the wall 3 in a continuous way, while the exiting openings 31 protrude through the wall 3. In contrast to the illustration of FIG. 1, the shaft 15 may also be designed to be continuous, as this is illustrated in FIG. 2.

In all embodiments of the novel apparatus, the fluidized layer 22 is realized and maintained due to the coordination of the upwardly flowing cleaning water and the movement of the lifting apparatus 21. In this way, one attains the fluidized layer 22 and the roll flow.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for separating organic material from inorganic material, comprising:
   a container having a wall an upper portion, and a lower portion;
   a feeding apparatus, said feeding apparatus being located in the upper portion of said container and being designed and arranged to introduce inorganic material polluted with organic material into said container;

a charging apparatus, said charging apparatus being located in the lower portion of said container and being designed and arranged to introduce cleaning water into said container;

a lifting apparatus, said lifting apparatus being located in said container, said lifting apparatus being designed and arranged to substantially subject the inorganic and organic material to an upwardly directed component of movement, said lifting apparatus and said charging apparatus being designed and arranged to produce a fluidized layer in said container during operation of said apparatus, the fluidized layer causing the organic material to be separated from the inorganic material, the fluidized layer having a vertical extension;

a discharging apparatus, said discharging apparatus being located in the lower portion of said container and being designed and arranged to discharge inorganic material from said container;

a removal apparatus, said removal apparatus being located in the upper portion of said container and being designed and arranged to remove organic material from said container; and a detector, said detector being located in the region of the vertical extension of the fluidized layer and at said wall of said container, said detector being designed and arranged to sense the density in the fluidized layer to control said discharging apparatus to keep the vertical extension of the fluidized layer approximately constant.

2. The apparatus of claim 1, wherein the inorganic material polluted with organic material is sand coming from sewage treatment plants.

3. The apparatus of claim 1, wherein said container has a horizontal center portion and said lifting apparatus includes a conveyor spiral and a shaft, said conveyor spiral and said shaft being located in the horizontal center portion of said container, said shaft being designed and arranged to drive said conveyor spiral.

4. The apparatus of claim 3, wherein said container has a horizontal center portion, said conveyor spiral has a lower end and said shaft of said conveyor spiral includes a deflecting plate, said deflecting plate being located at the lower end of said conveyor spiral and in the horizontal center portion of said container, said deflecting plate being designed and arranged to prevent water from flowing upwardly in the horizontal center portion of said container.

5. The apparatus of claim 1, further comprising a stirring tool including a driven shaft, said lifting apparatus being designed as a part of said stirring tool.

6. The apparatus of claim 1, wherein said charging apparatus is designed as an annular conduit including a plurality of exiting openings.

7. The apparatus of claim 6, further comprising a conical protecting collar,
   said container having an inner wall and a horizontal outer portion being surrounded by said inner wall,
   said conical protecting collar having a top side and a bottom side,
   said conical protecting collar being arranged above said annular conduit and such that it contacts said inner wall of said container with its top side,
   said conical protecting collar being designed and arranged not to contact said inner wall of said container with its bottom side such that it forms a free space with respect to said inner wall of said container, and
   said exiting openings of said annular conduit being directed towards the free space.

8. The apparatus of claim 1, wherein
   said charging apparatus is designed as an annular conduit including a plurality of exiting openings, and
   said container has a horizontal center portion and said lifting apparatus includes a conveyor spiral and a shaft, said conveyor spiral and said shaft being located in the horizontal center portion of said container, said shaft being designed and arranged to drive said conveyor spiral, said shaft being designed and arranged to extend below said annular conduit such that an annular cross-section for an upward flow of cleaning water is formed.

9. The apparatus of claim 8, wherein said conveyor spiral has a lower end and said shaft of said conveyor spiral includes a deflecting plate, said deflecting plate being located at the lower end of said conveyor spiral and in the horizontal center portion of said container, said deflecting plate being designed and arranged to prevent water from flowing upwardly in the horizontal center portion of said container.

10. The apparatus of claim 3, wherein said shaft further includes a plurality of stirring arms.

11. An apparatus for separating organic material from inorganic material, comprising:
   a container having a wall an upper portion, a lower portion, and a horizontal center portion;
   a feeding apparatus, said feeding apparatus being located in the upper portion of said container and being designed and arranged to introduce inorganic material polluted with organic material into said container;
   a charging apparatus, said charging apparatus being located in the lower portion of said container and being designed and arranged to introduce cleaning water into said container;
   a conveyor spiral unit, said conveyor spiral unit being located in the horizontal center portion of said container, said conveyor spiral unit including a conveyor spiral and a shaft, said shaft being designed and arranged to drive said conveyor spiral, said conveyor spiral unit being designed and arranged to substantially subject the inorganic and organic material to an upwardly directed component of movement, said conveyor spiral unit and said charging apparatus being designed and arranged to produce a fluidized layer in said container during operation of said apparatus, the fluidized layer causing the organic material to be separated from the inorganic material, the fluidized layer having a vertical extension;
   a discharging apparatus, said discharging apparatus being located in the lower portion of said container and being designed and arranged to discharge inorganic material from said container;
   a removal apparatus, said removal apparatus being located in the upper portion of said container and being designed and arranged to remove organic material from said container; and
   a detector, said detector being located in the region of the vertical extension of the fluidized layer and at said wall of said container, said detector being designed and arranged to sense the density in the fluidized layer to control said discharging apparatus to keep the vertical extension of the fluidized layer approximately constant.

12. The apparatus of claim 11, wherein said charging apparatus is designed as an annular conduit including a plurality of exiting openings.

13. The apparatus of claim 12, further comprising a conical protecting collar,
  said container having an inner wall and a horizontal outer portion being surrounded by said inner wall,
  said conical protecting collar having a top side and a bottom side,
  said conical protecting collar being arranged above said annular conduit and such that it contacts said inner wall of said container with its top side,
  said conical protecting collar being designed and arranged not to contact said inner wall of said container with its bottom side such that it forms a free space with respect to said inner wall of said container, and
  said exiting openings of said annular conduit being directed towards the free space.

* * * * *